No. 828,450. PATENTED AUG. 14, 1906.
J. S. BANCROFT & M. C. INDAHL.
TYPE CASTING MACHINE.
APPLICATION FILED DEC. 10, 1904.

7 SHEETS—SHEET 1.

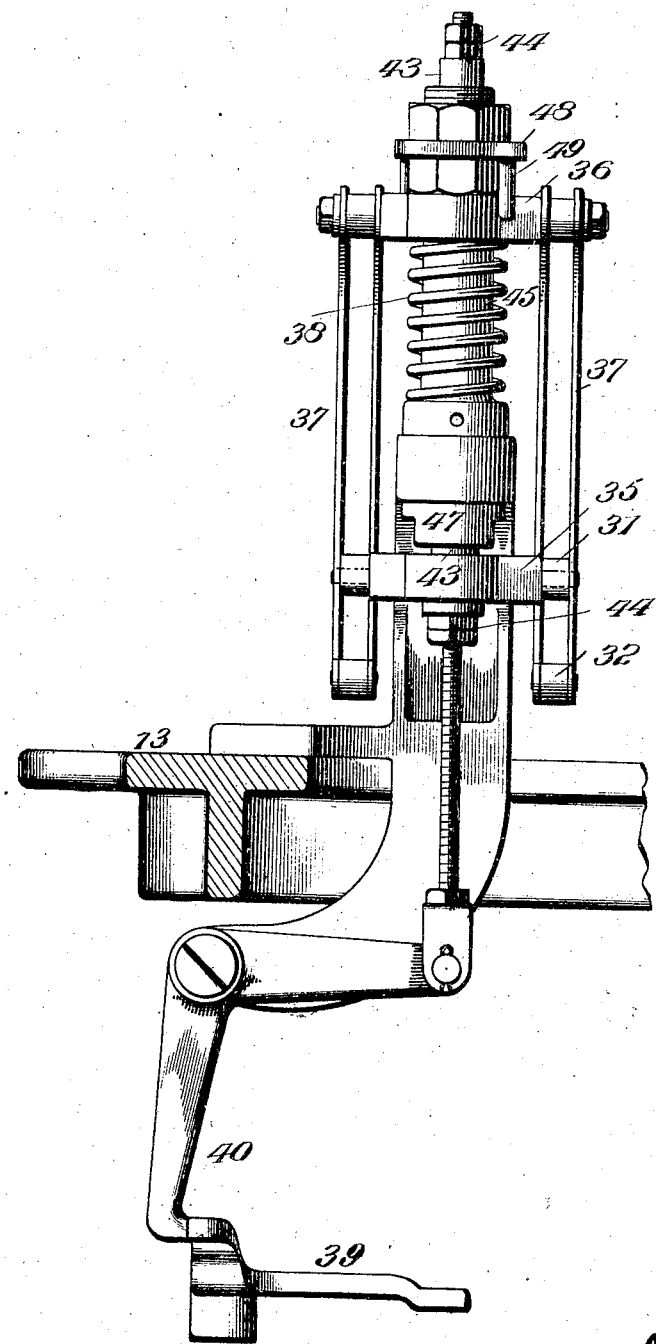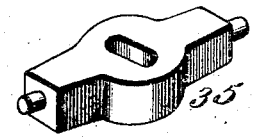

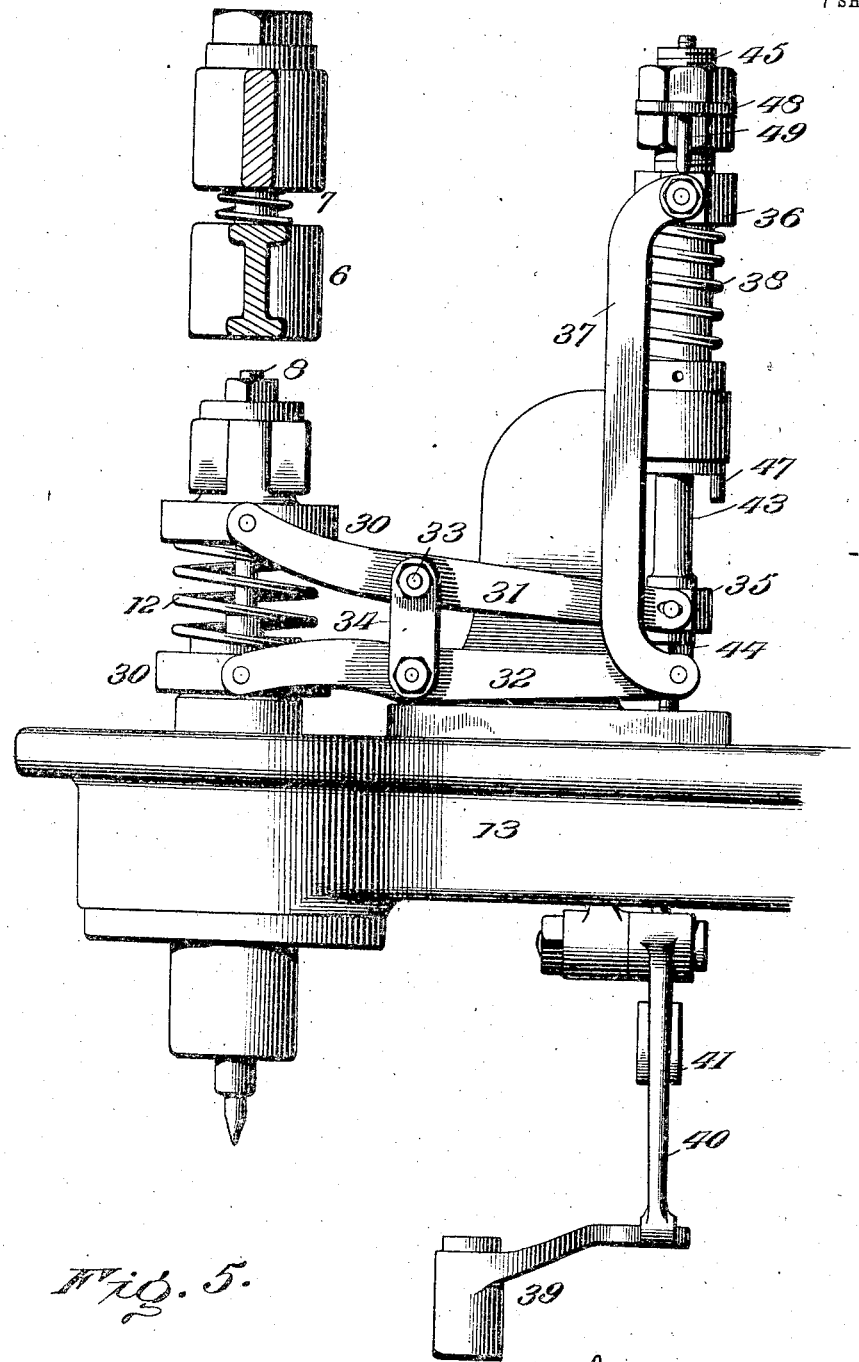

No. 828,450. PATENTED AUG. 14, 1906.
J. S. BANCROFT & M. C. INDAHL.
TYPE CASTING MACHINE.
APPLICATION FILED DEC. 10, 1904.

7 SHEETS—SHEET 5.

Witnesses
Thomas Durant
M. D. Church

Inventors
John Sellers Bancroft
Mauritz C. Indahl
By
Church & Church
Attorneys

No. 828,450. PATENTED AUG. 14, 1906.
J. S. BANCROFT & M. C. INDAHL.
TYPE CASTING MACHINE.
APPLICATION FILED DEC. 10, 1904.
7 SHEETS—SHEET 7.
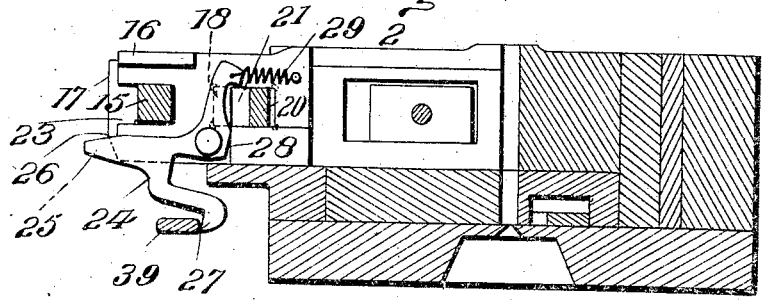
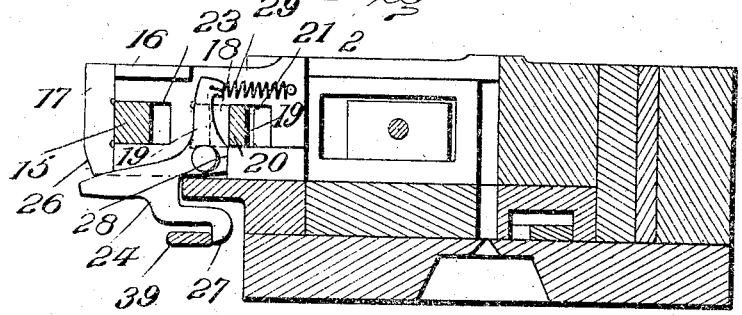
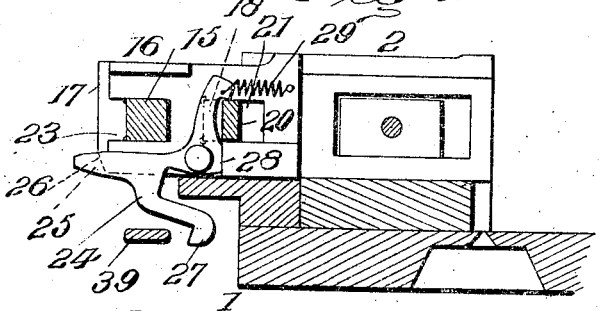
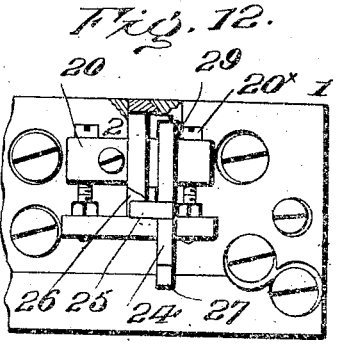
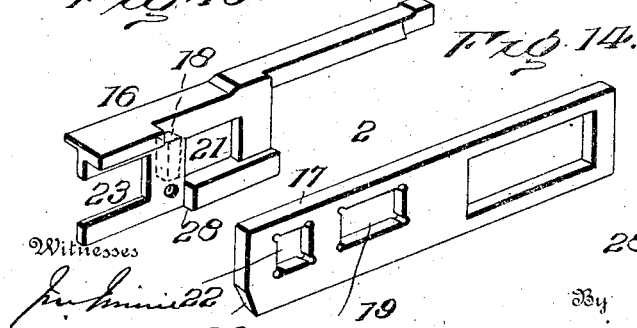
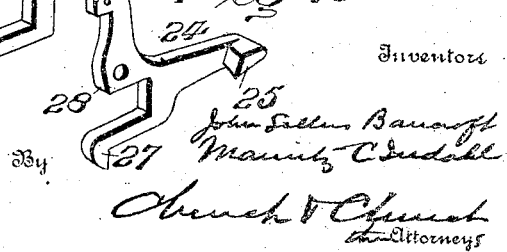

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

TYPE-CASTING MACHINE.

No. 828,450.     Specification of Letters Patent.     Patented Aug. 14, 1906.

Application filed December 10, 1904. Serial No. 236,328.

*To all whom it may concern:*

Be it known that we, JOHN SELLERS BANCROFT and MAURITZ C. INDAHL, of Philadelphia, in the county of Philadelphia, State of Pennsylvania, have invented certain new and useful Improvements in Type-Casting Machines; and we do hereby declare the following to be a full, clear, and exact description of the same, reference being had to the accompanying drawings, forming a part of this specification, and to the figures of reference marked thereon.

This invention relates to that class of type-casting machines in which the matrix is removably applied to and clamped upon a mold provided with a divided mold-blade or other form of cut-off for producing low quads or spaces; and it consists in a novel and improved means, hereinafter fully described, for controlling and effecting the action of said cut-off through the medium of the matrix-clamping mechanism.

Figure 1:
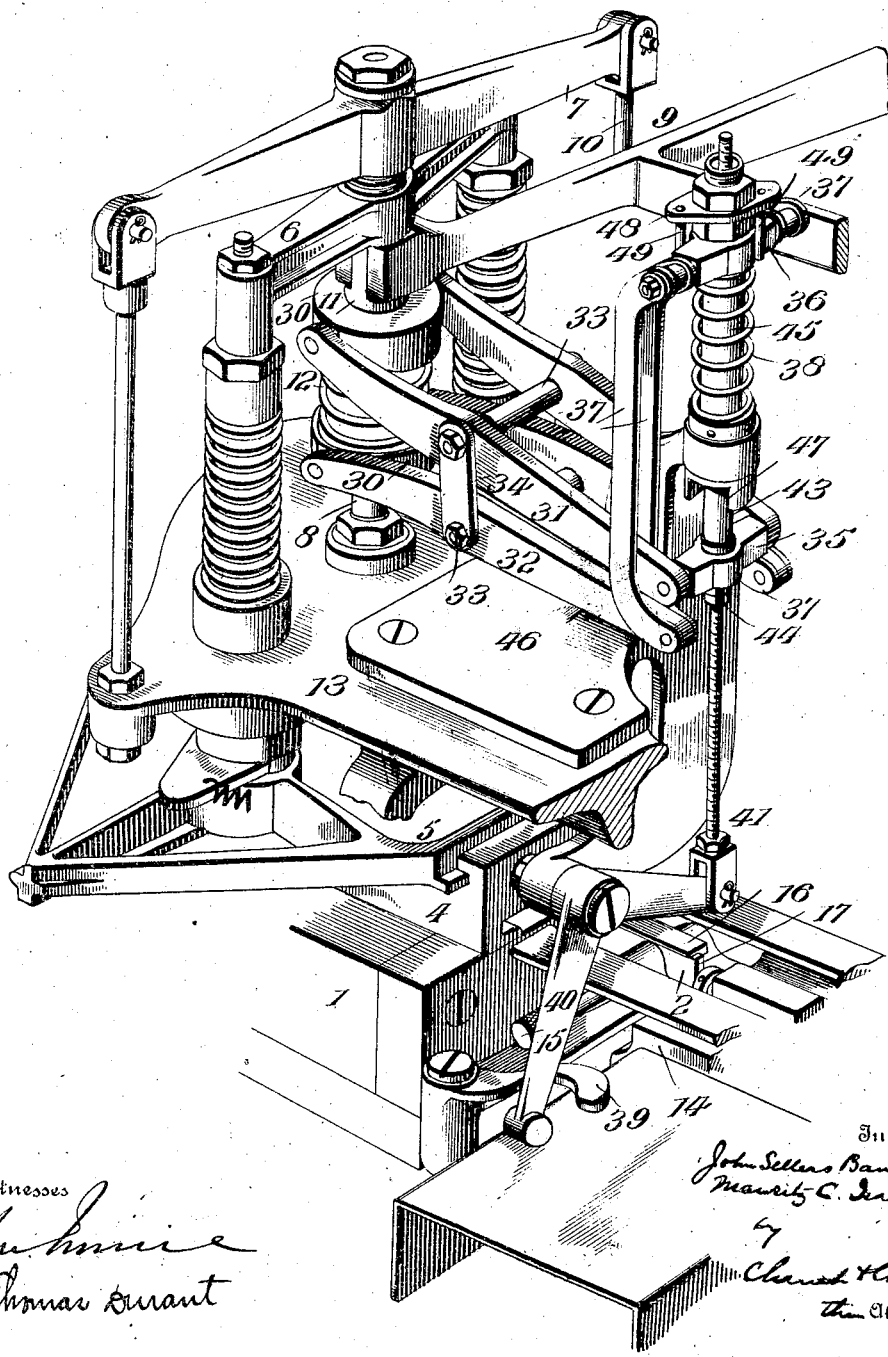
Figure 2:
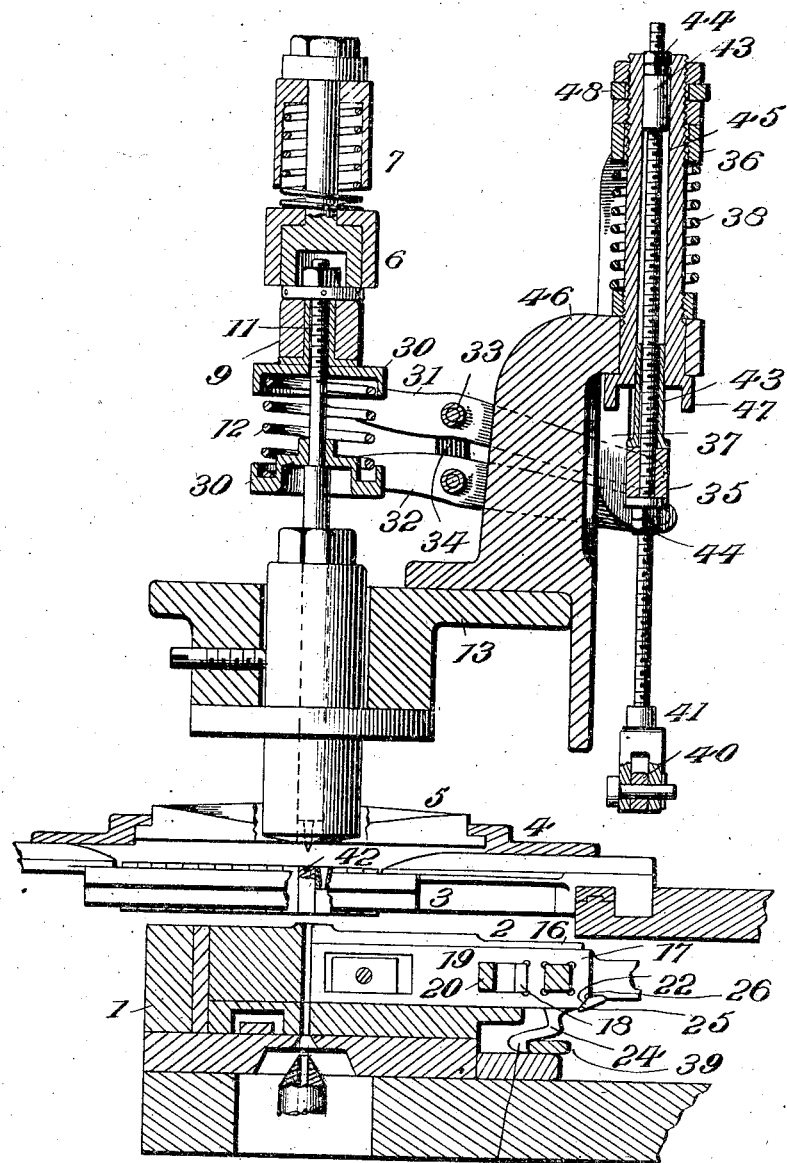
Figure 6:
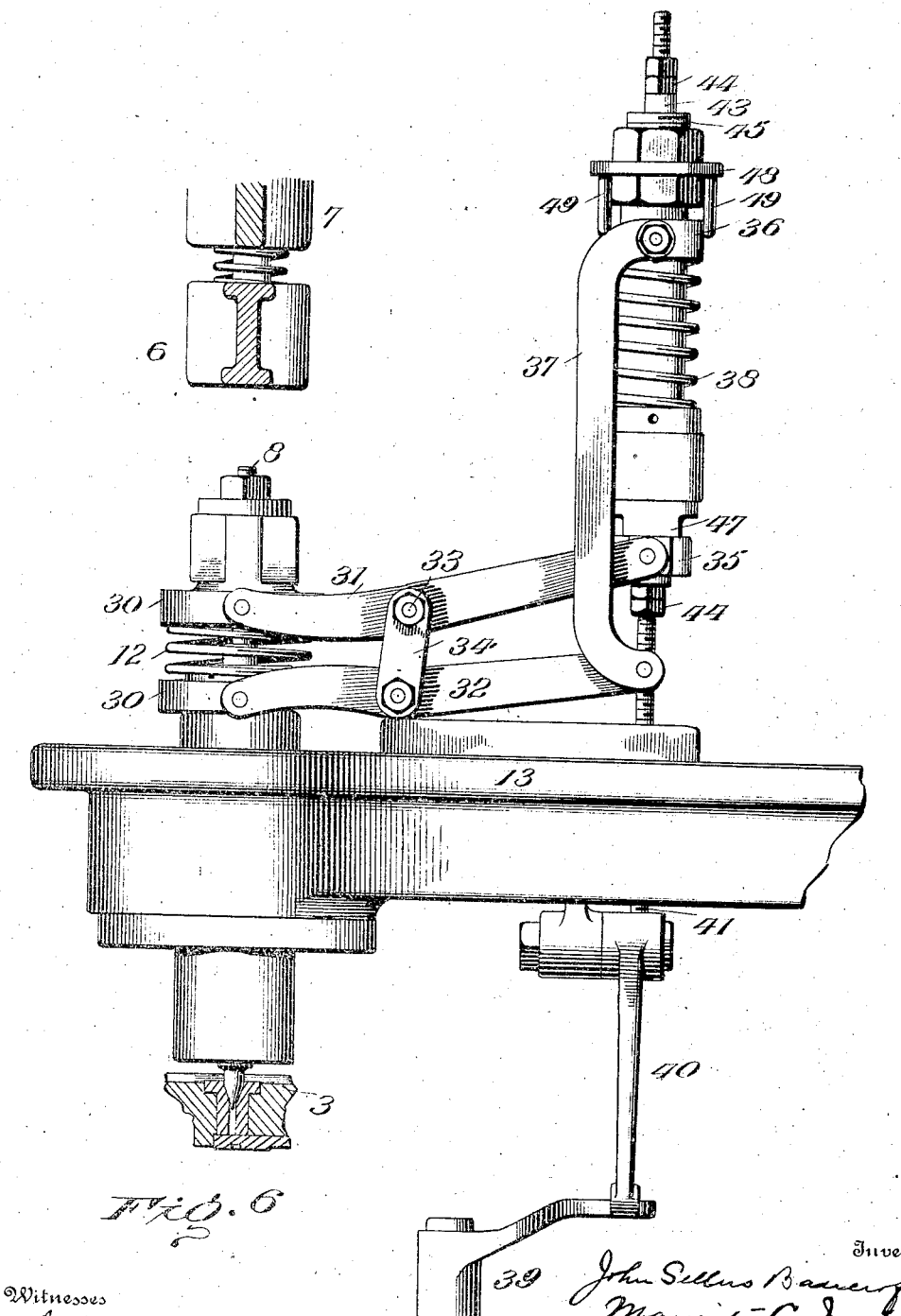
Figure 8:
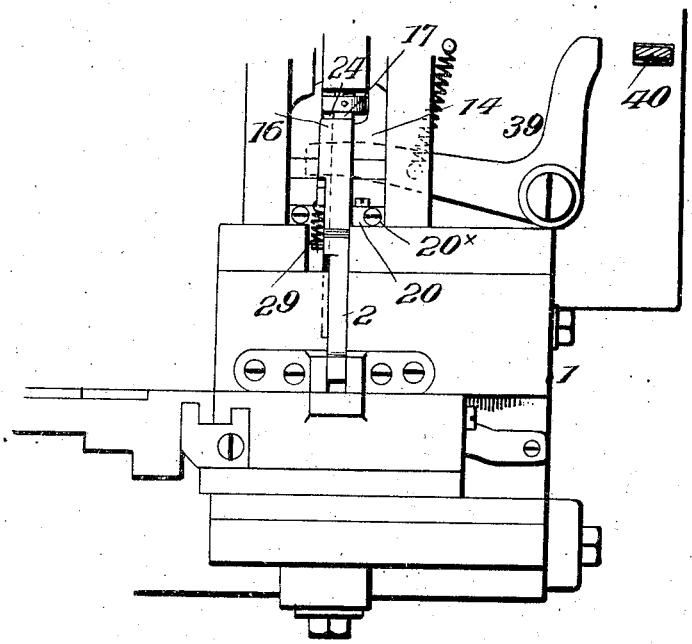
Figure 7:
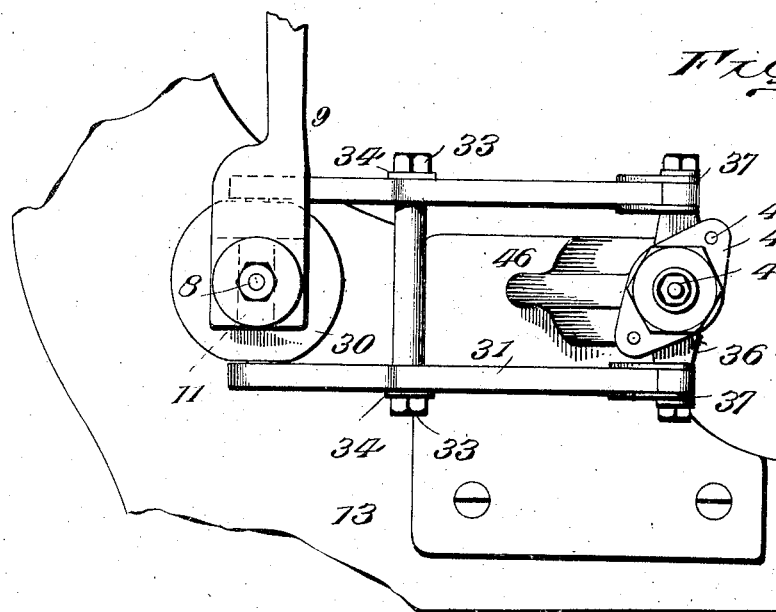

In the accompanying drawings, illustrating a preferred form of embodiment of said invention, Figure 1 is a perspective view of the attachment as applied to the mold and matrix centering and clamping mechanism of a familiar form of type casting and composing machine. Fig. 2 is a vertical section through the mold and the cut-off-actuating devices. Fig. 3 is an end elevation. Fig. 4 is a perspective view of the cross-head. Fig. 5 is a side elevation showing the attachment thrown out of action. Fig. 6 is a similar view showing the attachment adjusted to reinforce the compression-spring for casting large type. Fig. 7 is a top plan view of the actuating attachment. Fig. 8 is a top plan view of the mold and mold-blade adjusting devices. Fig. 9 is a vertical section through the mold, showing the mold-blade sections locked for simultaneous movement. Fig. 10 is a similar view showing the latch released and the upper section of the mold-blade advanced to close the mold. Fig. 11 is a side elevation of the divided mold-blade with the lower section advanced to eject the type and reëngage the upper section. Fig. 12 is a rear elevation of a portion of the mold, showing the mold-blade sections and their connections. Fig. 13 is a perspective of the upper or cut-off section of the mold-blade. Fig. 14 is a perspective of the lower mold-blade section. Fig. 15 is a perspective of the latch.

For the purpose of illustrating a preferred and practical embodiment of the invention it is shown applied to the type casting and composing machine of Patent No. 625,998, the latter being equipped with a mold containing a divided mold-blade of the character disclosed in application, Serial No. 236,347, filed concurrently herewith.

It will suffice for present purposes to designate those portions of the prior machine most nearly related to the improvements to be described, such as the mold 1, with its side blocks, cross-block, and sectional mold-blade 2; the die-case 3 and its frame 4, movable in transverse directions on the supporting-frame 5 to bring any matrix opposite the mold; the cross-head 6, to which the die-case-supporting frame is coupled; the die-case lever 7; the centering-plunger 8 for engaging the matrix to center and clamp the latter upon the mold; the main actuating-lever 9, coupled through link 10 with lever 7 and with the centering-plunger through movable head 11 and compression-spring 12; the bridge or frame 13, supporting the die-case and centering-plunger mechanisms, and the slide 14, carrying cross-pin 15 for reciprocating the mold-blade to adjust the latter for casting and to eject the type.

In operation the mold-blade is adjusted by cross-pin 15 to dimension the type-body, and the die-case is shifted to bring the desired matrix opposite the mold, whereupon actuating-lever 9 is depressed to advance the die-case and centering-plunger, the latter operating to clamp the selected matrix firmly upon the mold and hold it there under the pressure exerted by spring 12. When a low quad or space-type is desired, the upper section of the mold-blade is advanced into contact with the opposite wall of the mold-cavity to close the latter, and the lower section of the mold-blade is adjusted to suit the dimension of the type-body desired.

The parts thus far mentioned are common to prior machines and form no part of the present invention other than in their coöperative relation with the parts hereinafter described.

The rear portion 16 of the upper mold-blade section, Figs. 9 to 15, is offset and extended vertically by the side of the rear portion 17 of the lower section, and said upper section is furnished with a shoulder or gage 18, projecting within an opening or recess 19 in the lower section. The front stop 20 for limiting the forward motion of the mold-blade in ejecting type from the mold extends through opening 19 in the lower section and through a corresponding opening 21 in the upper section, while the cross-pin 15 engages an opening or seat 22 in the lower section of the mold-blade and is received in an elongated opening 23 in the upper section, the parts being so constructed, arranged, and proportioned that when the lower section of the mold-blade is advanced through the action of pin 15, to eject the type, gage 18 on the upper section will be positively engaged thereby and advanced into contact with the front stop 20, thus insuring the alinement of both sections at the casting-face, so that when locked together at this point, as will presently appear, said sections will present a flush casting-surface, such as is required in casting full body or character type, whereby the accidental projection of either section into the path of the cross-block and the damage incident thereto are absolutely prevented. It is to be noted that in this arrangement the rear wall of the slot or opening 19 where it contacts with projection 18 constitutes a gaging-surface for determining the relative positions of the mold-blade sections, that these opposing gaging-surfaces are maintained rigidly and positively in contact by the action of latch 24, carried by one and engaging the other section to hold their casting-surfaces in alinement, and that said gaging action is effected by the application of pressure to the lower or body section in a direction to clamp projection 18 between said lower section and the front stop or gage 20. In addition to the means for holding it to position upon the mold, the front stop 20 is provided with adjusting devices, such as screws 20×, for setting it down in engagement with the lower walls of openings 19 and 21 to form a top guide for the two sections of the mold-blade. This feature is of considerable importance as furnishing an additional top guide for both sections, materially assisting in holding the latter to position and preventing displacement or springing under conditions of use.

The locking of the two mold-blade sections for simultaneous action is effected through the medium of a latch 24, pivoted upon and carried by the upper section and provided with a beveled shoulder 25, coöperating with a beveled seat 26 on the lower section, an operating-arm 27, a limiting-stop 28, and a spring 29, the latter connected to the upper section and operating to hold shoulder 25 to its seat 26 when the two sections are in position to aline their casting-surfaces, as shown in Figs. 9 and 11. As thus arranged if pressure is applied to the operating-arm of latch 24 in the direction of the mold-cavity its shoulder 25 will be withdrawn from its seat, and the pressure continuing stop 28 will engage and the upper section of the mold-blade will be advanced positively until arrested by contact with the opposite wall of the cavity, leaving the lower section free to respond to the adjusting movements of pin 15. If now the pressure upon the latch is withdrawn at the time the lower section of the mold-blade is advanced to eject the low quad or space formed below the projected upper section, the two sections will be brought positively into alinement and the latch reëngaged.

The mechanism for effecting the independent action of the cut-off or upper section of the mold-blade is governed entirely by the matrix, the latter acting through the clamping devices for holding the matrix upon the mold, and said mechanism is so organized and equipped as to be readily thrown out of action when low quads or spaces are not desired, and when in this condition it can be utilized, if desired, to reinforce the normal compression-spring of the matrix-clamping devices when the machine is used as a sorts-caster after the manner described in application, Serial No. 235,126, filed December 1, 1904. To do this, advantage is taken of the circumstance that the driving member or actuator 9 for the matrix seating or holding mechanism is reciprocated positively and acts upon the driven member or plunger 8 through a yielding compression device 12. Consequently if for any reason the matrix-engaging member 8 is arrested before it reaches its final seating position the normal relation of the driving and driven members will be disturbed or varied, due to the shortening of the throw of one of said members. As this action takes place at a period in the cycle of operations when the adjustment of the cut-off can be effected—that is, between the seating of the matrix and the injecting of the molten metal into the mold—advantage has been taken of it for this purpose by the introduction between said driving and driven members of an actuating mechanism or device which remains neutral so long as the relative motions of the driving and driven members are not interfered with and becomes active to shift the cut-off for the mold whenever abnormal conditions are established either by design or accident, as will presently appear. In the preferred form of embodiment illustrated this cut-off-actuating mechanism is interposed between and coupled with the heads 30, against which the opposite ends of the compression-spring bear, one of said heads being engaged by and following the movements of the actuating-lever 9 and the other engaging and following the movements of the seating-plunger 8, and it comprises a pair of levers 31 32, preferably in duplicate, with their fulcra 33 connected by a link or links 34.

The power end of lever 31 is connected to the driving-head 30 and that of lever 32 to the driven head, while the weight end of lever 31 is connected to a cross-head 35 and the corresponding end of lever 32 to a cross-head 36, as by links 37, the latter arranged in pair, extending on opposite sides of lever 31 to bring the two levers into alinement. One of the cross-heads (in the present instance 36) is supported in position, as by a spring 38, and the other cross-head 35 is free to move and is coupled with the operating-arm 27 of the latch or other means for independently actuating the cut-off, as by a lever 39, with one arm intersecting the path of said operating-arm and the other in the path of a bell-crank 40, the latter connected by an adjusting-rod 41 to cross-head 35. The pair of pivotally-connected levers 31 32 constitute what is known as "floating tongs," and its members are so proportioned and arranged that so long as the driving and driven members to which they are coupled move in unison said floating tongs will swing freely upon their cross-heads; but as soon as the motions of the driving and driven members are rendered differential the relation of the power ends of the levers will be changed and the weight ends shifted accordingly. Such action takes place during the normal action of the machine whenever the spring 12 is compressed in seating the matrix; but as it is not required that the cut-off should be brought into action at this time allowance is made for this normal differential action by permitting lost motion or play in the connections, as by setting the lever 40 at such distance from lever 39 that no engagement will take place in response to such normal action. When, however, the driven member 8 is arrested considerably in rear of the normal seating position, the abnormal degree of motion transmitted through the floating tongs to cross-head 35 will be sufficient in extent to actuate lever 39 and set the cut-off. Any competent means for varying the normal relation of the driving and driven members might be employed for thus setting the cut-off; but the preferred plan is one in which the matrices are utilized for the purpose, so that the same means employed for designating the quad or space—i. e., the signal for bringing its matrix opposite the mold—may serve to operate the cut-off. To accomplish this, it is only required that the quad or space matrices, or at least those apportioned to low bodies, should be provided with means for effecting a premature interruption of the seating-plunger. This can be conveniently effected where the matrices are provided with bearings or conical centering-cavities to receive the plunger by providing the selected matrices (one or more) with seats or cavities of less depth than the character-matrices, as illustrated at 42 in Fig. 2, in which case it is not essential that the matrix should be blank, as usual, for even if provided with a character it would not affect the result, as the cut-off and not the matrix forms the end wall against which the cast is made. Among its other advantages this mode of operating the cut-off by intercepting the plunger possesses the capacity of preventing "squirts"—i. e., the escape of metal due to improper closure of the mold when the latter is occasioned by a failure from any cause to properly center the matrix—as in such event the engagement of the plunger with the die-case would bring the cut-off into action, thus closing the mold effectively. Spring 38 serves as a support for cross-head 36 and as a yielding or compression member for holding the cut-off in closed position and to avoid breakage in the event cross-head 35 was from any cause prevented from performing its excursions.

Thus far the normal action of the mechanism only has been described; but in addition thereto said mechanism is specially designed to be instantly thrown out of action or to be utilized to reinforce spring 12 when casting sorts. To these ends the adjusting-rod or connection 41, to which cross-head 35 is coupled, is provided with sleeves 43, forming, in connection with nuts 44, a means for positioning the rod relatively to the cross-head, said sleeve being received with a tubular guide 45, mounted upon a supplemental frame 46, attached to bridge 13. This frame also serves as a support for lever 40, so that the entire attachment may be removed from the machine with the bridge. Guide 45 is revolubly attached to frame 46 and is provided with a recessed head 47 next the cross-head 35, within which the latter reciprocates under normal conditions of use. The spring 38, supporting cross-head 36, is interposed between the latter and frame 46, and above the cross-head 36 is arranged a stop 48 in the form of a plate surrounding the upper end of guide 45 and provided with shoulders or projections 49. When it is desired to throw the attachment entirely out of action, cross-head 36 is depressed against its spring and the stop-plate 48 is turned until its shoulders 49 rest upon said cross-head, as seen in Fig. 5. The effect of this adjustment is to lower the weight ends of the pair of floating tongs, thereby withdrawing lever 40 from lever 39, so that the motion of the former cannot be communicated to the latter.

The use of the larger mold for sorts greatly increases the burden imposed upon the compression-spring 12 as adjusted for normal conditions. Hence it has been customary to apply an additional spring or springs to supplement its action. In the present instance this is rendered unnecessary, for by turning guide 45 until it intercepts cross-head 35 (see Fig. 6) the lower lever 32 of the tongs will be positively arrested when the plunger is seated and the further movement of the driving member to hold the matrix to its seat will be transmitted directly through the compression-spring 12 and indirectly through lever 32, whose weight end is upheld by spring 38 in a manner to cause the latter to react upon the driven member in the same direction as spring 12, thus reinforcing said last-named spring.

Having thus described our invention, what we claim as new, and desire to secure by Letters Patent, is—

1. In a mold for type-casting machines such as described and in combination with the mold-blade sections thereof, coöperating gaging-surfaces carried by said sections, and a latch carried by one section and engaging the other section to hold said gaging-surfaces in contact.

2. A mold for type-casting machines such as described provided with a sectional mold-blade the members whereof are adapted for simultaneous and dissimultaneous adjustment, opposing gaging-surfaces carried by said sections, and a latch carried by one section and interlocking with the other section, to detachably lock said gaging-surfaces in contact.

3. In a mold for type-casting machines such as described and in combination with the divided or sectional mold-blade thereof, means for locking the mold-blade sections together for simultaneous action consisting of a latch mounted upon one section and provided with a beveled shoulder engaging a seat on the other section.

4. In a mold for type-casting machines such as described, and in combination with the sectional mold-blade thereof, a latch pivotally mounted upon one section and provided with a beveled shoulder for engaging the other section, a retracting-spring, and an actuating-arm.

5. In a mold for type-casting machines such as described, the combination to form a sectional mold-blade therefor, of a lower or body section and an upper or cut-off section extending longitudinally of the lower section and provided with a gaging-surface engaging a shoulder on said lower section to aline the casting-faces of the two sections.

6. In a mold for type-casting machines the combination, to form the sectional mold-blade thereof, of the lower or body section recessed for the front stop or gage and provided with a gaging-surface, and the upper or cut-off section extending longitudinally of the lower section and provided with an offset portion in parallel relation to the side of the lower section, said offset portion provided with a transverse recess for the front stop or gage and a shoulder, the latter interposed between the gaging surface on the lower section and the front stop or gage, and a latch for locking the two sections together.

7. In a mold for type-casting machines the combination with the mold-blade sections and the front stop, of a shoulder or limiting-stop carried by one section and arranged between a gaging-surface on the other section and the front stop of the mold, so that when the last-named section is advanced it will clamp said shoulder or limiting-stop of the other section against the front stop, to aline the casting-faces of the two sections.

8. In a mold for type-casting machines the combination with the front stop or gage carried by the mold and the sectional mold-blade, of a gage-block attached to the upper or cut-off section and extending between a gaging-surface on the body or lower section and the front stop or gage, to aline the casting-faces of the sections, adjusting or reciprocating means coupled with the lower or body section, a latch carried by the upper or cut-off section for locking the sections together, and means for engaging said latch to disconnect the sections, and adjust the upper or cut-off section independently of the lower or body section.

9. In a type-casting machine such as described and in combination with the mold thereof with its sectional mold-blade, of a gage carried by the upper or cut-off section and interposed between the front stop and the lower or body section; a latch carried by the upper section and engaging a shoulder on the lower section; actuating devices coupled with the lower or body section, to reciprocate the latter alone or in connection with the upper section, and actuating devices for engaging the latch, to detach the upper or cut-off section and move it independently of the lower or body section.

10. In a type-casting machine such as described provided with a cut-off or low-quad attachment for the mold, and in combination therewith an actuating means for said cut-off controlled by the matrix.

11. In a type-casting machine such as described provided with an adjustable mold, movable matrices and a cut-off or low-quad attachment, and in combination therewith, actuating devices for the cut-off selectively controlled by the matrices, to produce full-body or short-body type as required.

12. In a type-casting machine such as described provided with a plurality of matrices, an adjustable mold, metal-injecting devices, means for selectively presenting and clamping the matrices to the mold and a cut-off or low-quad attachment for the mold and in combination therewith an actuating mechanism for the cut-off controlled by the matrices for producing full or short body type as designated by the selected matrix.

13. In a type-casting machine such as described provided with a cut-off or low-quad attachment for the mold, a movable die-case and means for clamping selected matrices upon the mold, and in combination therewith, actuating devices for said cut-off adapted to be brought into action, to close the mold, by curtailing the stroke of the matrix-clamping device.

14. In a type-casting machine such as described provided with a mold, a matrix movable toward and from the mold, a cut-off or low-quad attachment, and means for clamping the matrix to the mold including driving and driven members and a compression device and in combination therewith a cut-off actuating mechanism interposed between the driving and driven members of the matrix-clamping devices and operating to advance the cut-off by the arrest of said driven member.

15. In a type-casting machine such as described the combination of the following elements, to wit; a mold provided with a cut-off or low-quad attachment; a plurality of matrices with means for selectively presenting individual matrices opposite the mold; means for clamping the selected matrix upon the mold; and cut-off-actuating mechanism controlled by the selected matrix and operated by the clamping devices.

16. In a type-casting machine such as described the combination of the following elements, to wit; an adjustable mold provided with a cut-off or means for closing one end thereof, to produce low quads or spaces; a plurality of matrices with means for selectively presenting individual matrices to the mold; means for clamping the selected matrix upon the mold, including driving and driven members and an interposed compression device; and means for actuating the cut-off or mold-closing device coupled with said driving and driven members.

17. In a type-casting machine such as described the combination of the following elements, to wit; an adjustable mold provided with a cut-off or low-quad attachment; a plurality of matrices of which those representing characters are equipped with bearings in a different plane from those for spaces; means for clamping selected matrices upon the mold including a driving member, a compression device and a driven member the latter engaging the bearing on the selected matrix; and a cut-off-actuating mechanism coupled with said driving and driven members, to bring the cut-off into action.

18. In a type-casting machine such as described the combination of the following elements, to wit; a mold provided with a sectional mold-blade, a latch for connecting the mold-blade sections, and adjusting devices connected with one of said sections; a plurality of matrices adapted for separate application to the mold and each provided with a bearing to receive a pressure device, said bearing being located in different positions according to the character of type represented by the matrix; matrix-clamping devices including a driving member, a compression member and a driven member, the latter contacting with the bearing of the selected matrix; and actuating devices interposed between said driving and driven members and coupled with the latch connecting the mold-blade sections.

19. In a type-casting machine such as described, the combination with the driving and driven members and interposed compression-spring for seating the matrix upon the mold, of a pair of floating tongs coupled with said driving and driven members, and with the cut-off or low-quad attachment for the mold.

20. In a type-casting machine such as described provided with a matrix seating or clamping mechanism and a mold containing a cut-off or low-quad attachment and in combination therewith an actuating mechanism for said cut-off comprising a pair of pivotally-connected levers of which one is attached to the driving and the other to the driven members of the matrix seating or clamping mechanism, a fixed support for one of said levers, and a connection between the other lever and the cut-off.

21. In a type-casting machine such as described, the combination of the following elements, to wit; a compressing mechanism provided with a driving member, a driven member and an interposed compression member, and a pair of floating tongs or connected levers of which one lever is coupled to the driving member and to transmitting devices coupled with a mold cut-off, and the other lever is connected to the driven member and a support.

22. In a type-casting machine such as described provided with a mold, a movable matrix, and means for seating the matrix upon the mold including driving and driven members with intermediate compression member and in combination therewith a pair of floating tongs connected to said driving and driven members and provided with a compression member adapted to reinforce the action of the first-named compression member for holding the matrix upon the mold.

23. In a type-casting machine such as described provided with a mold containing a cut-off attachment, a movable matrix, and means for seating the matrix upon the mold including driving and driven members and an interposed compression member and in combination therewith a pair of floating tongs comprising a plurality of levers pivotally connected and each provided with a cross-head or support, one of said levers being coupled to the driving and the other to the driven member, an elastic support for one cross-head and transmitting devices intermediate the other cross-head and the cut-off.

24. In a type-casting machine such as described and in combination with the matrix-seating plunger, its compression-spring and actuator or driving member thereof, an actuating attachment for the mold cut-off comprising a pair of levers pivotally connected and coupled with the plunger and driving member respectively, a yielding support for one of said levers, and transmitting devices connected to the opposite lever.

25. In a type-casting machine such as described the combination with the matrix-seating plunger, its compression-spring and driving member of an actuating device or mechanism controlling the mold-blade cut-off comprising two levers pivotally united intermediate their ends, and connected the one with the plunger and the other with its driving member, a compression-spring coupled with one of said levers, and a transmitting device or lever coupled to the other of said levers.

26. In a type-casting machine such as described, the combination with the matrix-seating plunger, its compression-spring and driving member or actuator, of a pair of floating tongs comprising connected levers pivotally supported at one end and coupled at the opposite ends, the one to the plunger and the other to the driving member, a sustaining-spring for the pivot end of one lever and transmitting devices coupled with the corresponding end of the other lever.

27. In a type-casting machine such as described the combination with the driving and driven members of the plunger, of a pair of floating tongs comprising pivotally-connected levers with corresponding ends connected to the driving and driven members respectively, their opposite ends being pivotally supported, the one by a compression-spring and the other by a transmitting member, and means for varying the position of said spring-supported lever, to adjust the transmitting member.

28. The combination, to form a cut-off-actuating mechanism for type-casting ma-ÆÆ tuating mechanism for type-casting machines such as described, of the following elements, to wit; a pair of pivotally-connected levers; a driving member carrying one of said levers and a driven member carrying the corresponding end of the other lever; independent supports or cross-heads to each of which one of said levers is pivotally connected, to permit simultaneous or dissimultaneous movement of said levers; a spring resisting the movement of one of said supports, and transmitting devices coupled to the other support.

29. In a type-casting machine such as described the combination with the driving, driven and compression members of the matrix-seating mechanism and the mold provided with a cut-off or low-quad attachment, of an actuating mechanism for said cut-off or low-quad attachment comprising a pair of floating tongs coupled with said driving and driven members and pivotally attached to movable supports, the one provided with a compression member and the other with transmitting devices, and means for positioning the first-named support, to vary the relation of the tongs to the driving member and adjust the transmitting devices.

30. In a type-casting machine such as described, provided with a mold, a movable matrix and a seating mechanism for the latter including driving, driven and compression members, and in combination therewith a pair of floating tongs connected at one end to the driving and driven members, respectively, to reciprocate therewith, both members of said tongs being pivotally connected the one to a support provided with a compression member and the other to a support connected to transmitting devices, and means for limiting the movement of one support and for varying the position of the other support, whereby the floating tongs may be used to supplement the action of the first-named compression member or to vary the position of the transmitting devices, to couple or uncouple with a cut-off for the mold.

31. In a type-casting machine such as described, the combination with driving and driven members and a pair of floating tongs coupled therewith, of a movable support for each member of the tongs, a compression-spring and variable positioning device for one of said supports, and transmitting devices coupled with the other support.

32. In a type-casting machine such as described, the combination with the pair of floating tongs connected at one end to the driving and driven members of the matrix-seating mechanism and at the opposite end to independent movable supports of which latter one is coupled with transmitting devices for actuating the cut-off for the mold and the other is provided with a compression-spring and a movable holder.

33. In a type-casting machine such as described provided with a mold, cut-off, a plurality of matrices and a matrix-seating mechanism including driving, driven and compression members and in combination therewith a cut-off-actuating mechanism mounted upon the bridge which supports the matrix-seating mechanism.

34. In a type-casting machine such as described, provided with a mold, a cut-off, a plurality of matrices and a matrix-seating mechanism including driving, driven and compression members, and in combination therewith of a cut-off-actuating mechanism including a pair of floating tongs connected at one end to said driving and driven members and pivotally attached at the opposite end to independent movable supports, the one connected with transmitting devices leading to the cut-off and the other provided with a compression-spring, said cut-off-actuating mechanism being wholly supported upon a supplemental frame attached to the casting-machine and removable therefrom.

35. In a type-casting machine such as described, an actuating mechanism for the mold cut-off comprising the following elements in combination, to wit; a pair of floating tongs consisting of two levers pivotally connected and supported for simultaneous and dissimultaneous movement; two independently-movable supports to each of which one of said levers is pivotally connected; a transmitting connection coupled to one of said supports; and a compression device applied to the other of said supports in position to resist the approach of said two supports.

36. In a type-casting machine an actuating mechanism for the mold cut-off comprising the following elements in combination, to wit; a pair of floating tongs including two sets of levers pivoted together and arranged for simultaneous and dissimultaneous movement; two cross-heads, one for each set of levers, to which the latter are pivotally connected; a revoluble guide upon which one of said cross-heads is mounted provided with a limiting-shoulder for the opposing cross-head; transmitting devices coupled with said last-named cross-head; and a spring engaging said first-mentioned cross-head.

37. In a type-casting machine an actuating mechanism for the mold cut-off, convertible into an auxiliary compression device for a sorts-caster comprising the following elements, in combination, to wit; a matrix-seating mechanism including driving, driven and compression members; a pair of floating tongs coupled with said driving and driven members; two oppositely-movable supports to each of which one lever of the tongs is pivotally connected; a spring acting upon one of said supports, to resist their approach; and means for controlling the extent of motion permitted the opposite support.

38. In a type-casting machine an actuating mechanism for the mold cut-off convertible into an auxiliary compression device for a sorts-caster comprising the following elements, to wit; matrix-seating devices including driving, compression and driven members; a pair of floating tongs whose levers are connected to said driving and driven members, respectively, and pivotally attached to oppositely-movable supports; a spring acting upon one of said supports to resist its movement; means for adjusting the position of said last-named support; and means for controlling the extent of motion of the opposite support the latter being coupled with the cut-off mechanism.

39. In a cut-off-actuating mechanism for the molds of type-casting machines such as described the combination of the following elements, to wit; a plurality of levers pivotally connected in pairs to form floating tongs, two cross-heads, one for each pair of levers, to which the latter are pivotally connected; a transmitting rod or connection for one of said cross-heads; a tubular guide for said rod; a spring surrounding the guide and engaging the other cross-head; and a plate revolubly mounted upon said guide and provided with shoulders or pins for engaging the cross-head when shifted in opposition to the spring-pressure, to change the relation of the tongs-support to the driving and driven members.

40. In a type-casting machine such as described, the combination with a mold provided with a divided mold-blade, means for connecting the mold-blade sections for simultaneous adjustment and a lever controlling said connecting means, of a second lever mounted in position to engage said first-named lever, a rod connected to said second lever, a pair of floating tongs one member whereof is coupled with said rod and the other to a cross-head or support provided with a spring, means for positioning said last-named cross-head or support, and a transmitting mechanism including driving, compression and driven members of which the driving element carries one member of the tongs and the driven element the other member.

41. In a type-casting machine provided with a cut-off or low-quad mold and in combination with the latter, means for controlling the cut-off member, to form short-body type, comprising driving and driven members and actuating devices adapted to remain neutral so long as the relative motions of the driving and driven members are not interfered with, and to become active, to shift the cut-off, whenever the relative motions of the driving and driven members are varied either by accident or design.

42. In a type-casting machine provided with a cut-off or low-quad mold and matrix-seating devices and in combination therewith, means controlled by the matrix-seating devices for actuating the cut-off member.

JOHN SELLERS BANCROFT.
MAURITZ C. INDAHL.

Witnesses:
MORTIMER A. JONES,
W. A. START.